United States Patent [19]
Urry

[11] 3,877,992
[45] Apr. 15, 1975

[54] PRIMARY DRY CELL WITH FAIL-SAFE VENT

[75] Inventor: Lewis F. Urry, North Olmsted, Ohio

[73] Assignee: Union Carbide Corporation, New York, N.Y.

[22] Filed: Aug. 1, 1973

[21] Appl. No.: 384,446

[52] U.S. Cl. .............. 136/107; 136/133; 136/177
[51] Int. Cl. ............................................ H01m 1/06
[58] Field of Search....... 136/177, 178, 107, 100 M, 136/133, 163, 169, 170, 180; 220/44 R, 89

[56] References Cited
UNITED STATES PATENTS

| | | | |
|---|---|---|---|
| 1,836,903 | 12/1931 | Chaney | 136/133 X |
| 1,930,578 | 10/1933 | Barrett | 136/178 X |
| 2,111,041 | 3/1938 | Brennan | 220/89 |
| 2,144,959 | 1/1939 | Blackburn | 136/170 X |
| 2,282,459 | 5/1942 | Deeley | 136/178 UX |
| 2,306,409 | 12/1942 | Ruben | 136/100 M |
| 3,301,713 | 1/1967 | Lozeau | 136/177 |
| 3,494,801 | 2/1970 | Urry | 136/178 |
| 3,669,302 | 6/1972 | Markarian | 220/44 R |

Primary Examiner—Anthony Skapars
Attorney, Agent, or Firm—John R. Doherty

[57] ABSTRACT

Disclosed is a primary dry cell, and particularly a magnesium cell, incorporating a fail-safe vent in the seal closure for the cell container, wherein the seal closure includes an annular insulating cover fitting tightly around the central carbon electrode rod forming a juncture therebetween which is tightly sealed except for a gas-venting passageway formed by complementary portions of the cover and carbon electrode rod. During normal operation of the cell, the gas-venting passageway is closed by a normally solid fusible sealant material. The sealant has a softening or melting point which substantially corresponds to some critical high internal cell temperature at which it is necessary to vent gas from inside the cell.

10 Claims, 7 Drawing Figures

3,877,992

PRIMARY DRY CELL WITH FAIL-SAFE VENT

This invention relates to primary dry cells in general, and more particularly to improvements in magnesium dry cells. More specifically, the invention relates to magnesium dry cells of the cylindrical or round type wherein the active cell elements are enclosed within an open ended cylindrical anode-container made of magnesium metal or a magnesium alloy and to the provision of a fail-safe vent within the seal closure used to seal the open end of the cell container.

BACKGROUND OF THE INVENTION

It is generally known that good service capacities can be attained with magnesium cells if the moisture content in the cathode mix cake is maintained at a high level both during storage and use. Consequently, magnesium cells are tightly sealed during assembly. Sealed magnesium cells, on the other hand, can generate copious quantities of gas under certain conditions. In order to cope with this problem, the cells usually incorporate a vent for releasing excessive internal gas pressures that may develop. Resealable type vents are most preferred since once the excessive gas pressure has been relieved, the vent closes and reseals itself and prohibits moisture from escaping outside of the cell. One type of resealable vent that has been successfully used is disclosed in U.S. Pat. No. 3,494,802 issued to L. F. Urry on Feb. 10, 1970. However, the problem with resealable vents is that they are not capable of rapidly releasing very high internal gas pressures that may sometimes develop over a short period of time. Such conditions can be encountered in a magnesium cell, for example, if the cell is subjected to a short circuit. The cell undergoes what is commonly referred to as "thermal run-a-way", a phenomena which manifests itself in the substantially continuous liberation of heat during the time that the cell is maintained on short-circuit load. The heat which is evolved tends to improve the cell reaction efficiency which in turn allows the cell to produce more electric current and even more heat is liberated. The phenomena further manifests itself in the very rapid generation of gas which can lead to the build-up of dangerously high internal gas pressures.

It has already been proposed to provide a magnesium dry cell with a fail-safe vent in order to cope with the problem of releasing high internal gas pressures which may suddenly develop inside the cell. Such a fail-safe vent may consist, for example, of a vent opening provided within an intermediate portion of the insulating cover used to seal the open end of the cell container. The vent opening is closed by a low melting point sealant during normal operation of the cell. However, when the cell reaches some critical high internal temperature the sealant softens or melts and opens the vent to allow gas to escape from inside the cell.

The problem with fail-safe vents of this type has been that the insulating cover which is usually made of a thermoplastic material, may also reach its softening point if the cell operates at the high temperatures (e.g. about 200°F.) for any sustained period of time. This can cause the vent opening to deform and become partially or even totally blocked, and thus prohibit proper venting of gas.

Accordingly, it is the primary object of this invention to provide an improved fail-safe vent for a primary dry cell.

A more specific object of the invention is to provide a fail-safe vent for a primary dry cell which will maintain the cell in a sealed condition during normal operation, but which will open and remain open once the cell reaches some predetermined high temperature level.

Another object of the invention is to provide a fail-safe vent for a primary dry cell which is easily incorporated within the seal closure of the cell without the use of any additional components and which therefore does not significantly increase the cost of manufacture.

BRIEF STATEMENT OF THE INVENTION

The foregoing and other objects of this invention are achieved by the provision in a primary dry cell and particularly a magnesium cell, of a fail-safe vent for rapidly releasing high internal gas pressures at some predetermined high temperature level. The fail-safe vent may be formed by existing parts of the cell including the seal closure used to seal the open end of the cell container. The seal closure includes an annular insulating cover which may be made of a thermoplastic material and which has its inner peripheral surface fitting tightly around the central carbon electrode rod. The cover and carbon electrode rod form a juncture therebetween which is tightly sealed except for a gas-venting passageway which is formed by complementary portions of the cover and carbon electrode rod. This gas-venting passageway extends through the seal juncture into communication with the interior of the cell.

In one embodiment of the invention, the gas-venting passageway is formed in part by the provision of an indentation, e.g. a slot, cutout or notch, within the inner peripheral surface of the cover. The passageway is completed upon assembly of the cover by the outer surface portion of the carbon electrode rod which coincides with the indentation.

In another embodiment of the invention, the gas-venting passageway is formed in part by the provision of an indentation, e.g. a longitudinal slot, within the carbon electrode rod. In like manner, the passageway is completed during assembly of the cover by the portion of the inner peripheral surface of the cover which coincides with the indentation.

During normal operation of the cell, the gas-venting passageway is closed by means of a normally solid fusible sealant material. This sealant has a softening or melting point which substantially corresponds to the critical high internal cell temperature at which it is necessary to vent gas from inside the cell.

If the cell reaches this critical high temperature during storage or use, the heat evolved internally will cause the sealant to soften or melt whereupon the gas-venting passageway will open and allow gas to vent from inside the cell. With the present fail-safe vent structure, the gas-venting passageway is kept open owing to the structural stability at elevated temperatures of the portion of the central carbon electrode rod which cooperates to form part of the passageway, even though heat continues to evolve and the thermoplastic cover begins to soften and deform.

The cell may also include in addition to the fail-safe vent of the invention, a resealable vent of the type disclosed in U.S. Pat. No. 3,494,802, supra, for venting gas at low temperatures and pressures during normal operation of the cell.

The novel features which are considered as characteristic of the fail-safe vent of the invention have been set forth briefly hereinabove, both as to its construction and mode of operation. A more detailed understanding of the fail-safe vent and its novel features and advantages may now be had from the ensuing description of specific embodiments thereof taken with reference to the accompanying drawing.

DESCRIPTION OF THE PREFERRED EMBODIMENTS

Figure 1:
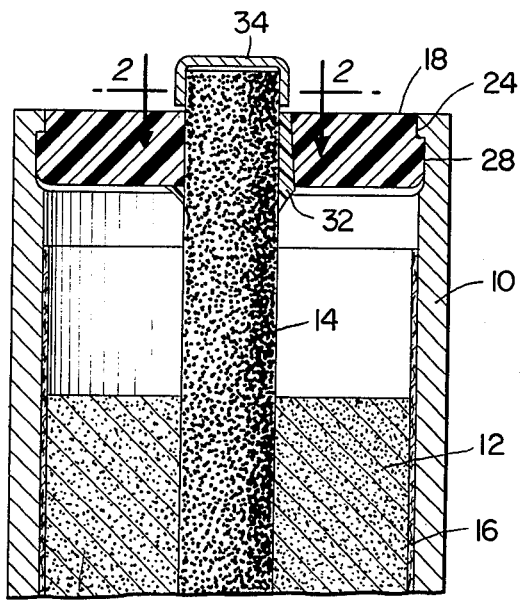
FIG. 1 is an elevational view partially in section of the upper portion of a primary dry cell incorporating one embodiment of the fail-safe vent of the invention.
Figure 2:
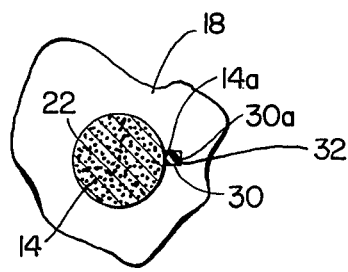
FIG. 2 is a fragmentary view of a part of the cell shown in FIG. 1, taken along the line 2—2 thereof.
Figure 3:
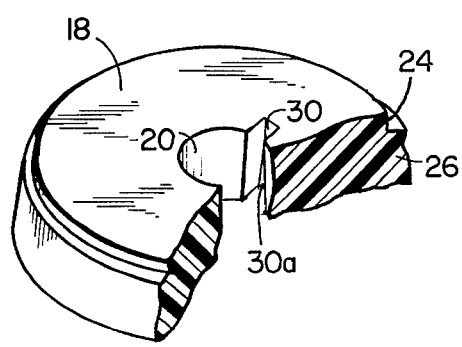
FIG. 3 is a perspective view of the seal cover used in the cell of FIG. 1 with part being broken away to show its construction in greater detail.
Figure 4:
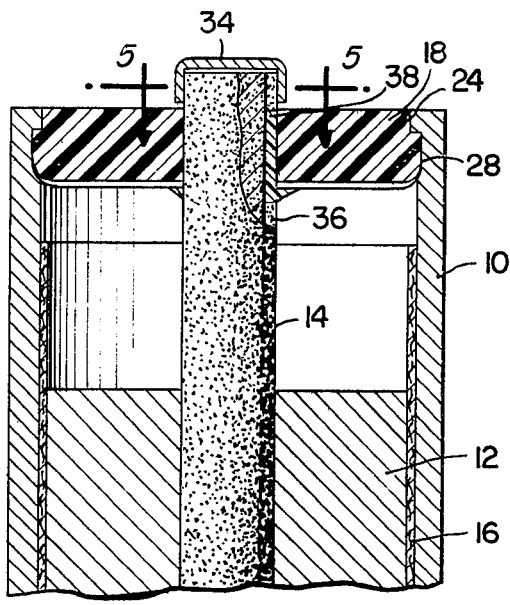
FIG. 4 is an elevational view partially in section of the upper portion of a primary dry cell incorporating another embodiment of the fail-safe vent.
Figure 5:
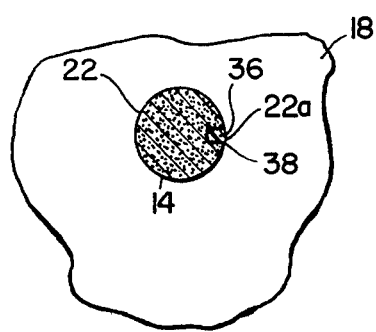
FIG. 5 is a fragmentary view of a part of the cell shown in FIG. 4, taken along the line 5—5 thereof.

Referring to FIGS. 1–3 of the drawing, there is shown a primary dry cell embodying the invention. The cell includes a cylindrical metal anode-container 10 which may be provided in the form of an open cup made from a consumable metal, such as magnesium or zinc, for example (a zinc cup in the case of a conventional Leclanche dry cell). Within this anode-container 10 is the usual cathode comprising a compressed depolarizer mix cake 12 consisting of maganese dioxide particles, acetylene black, an electrolyte and a central carbon electrode rod 14. The carbon electrode rod 14 is suitably treated or impregnated with wax or like substance to render it impervious to liquid. The depolarizer mix cake 12 surrounds the central carbon electrode rod 14 which protrudes at one end beyond the open end of the anode-container 10. An ion-permeable separator 16 in the form of a bibulous paper sleeve surrounds the cathode and separates the depolarizer mix cake 12 from the inner side wall of the anode-container 10. Separator 16 may consist of a methylcellulose coated paper, for example.

The seal closure for the cell comprises a flat annular insulating cover 18 made from a thermoplastic material, such as polyethylene. This insulating cover 18 has its inner peripheral surface 20 fitting tightly around the carbon electrode rod 14 just below its protruding end forming a tight seal juncture therewith as denoted by the reference numeral 22 in FIG. 2.

The insulating cover 18 is made of a size which is slightly larger than the inner diameter of the anode-container 10. Within its outer peripheral edge portion the cover 18 is provided with a shallow circular recess 24 which corresponds substantially in size with the inner diameter of the anode-container 10. During assembly of the cell, the cover 18 is force-fitted through the open end of the anode-container 10 so that its outer peripheral edge 26 is locked in engagement with an annular groove 28 formed within the upper side walls of the anode-container 10. The resiliency of the anode-container 10 causes its side walls to be forced radially inwardly into tight physical contact around the outer peripheral edge 26 of the cover 18 whereby a tight seal is attained between the cover 18 and the side walls of the anode-container 10.

The cover 18 is formed within its inner peripheral surface 20 with a substantially rectangular shaped slot 30 as more particularly shown in the view of FIG. 3. When the cover 18 is force-fitted around the central carbon electrode rod 14 during assembly of the cell, the slot 30 together with the coinciding surface portion 14a (see FIG. 2) on the central carbon rod 14, forms a gas-venting passageway which communicates with the interior of the cell. Preferably, in this embodiment of the invention, the slot 30 is formed within the inner peripheral surface 20 to a fairly deep depth which is greater than the width of the slot. As more clearly shown in FIG. 2, the slot 30 is defined by two opposite side walls and a rear wall 30a. The two opposite side walls represent the longest dimension of the slot and preferably are at least twice as long as the rear wall 30a. For purposes to be made more clear hereinafter, the rear wall 30a is inclined at a small angle to the central axis of the cover 18 such that the slot 30 has a larger opening at the bottom than at the top surface of the cover 18. Preferably, the cover 18 is molded with the slot 30 formed in place within its inner peripheral surface 20. It will be understood, of course, that the slot may also be cut or punched out from the cover 18 if so desired.

The gas-venting passageway formed by the slot 30 is closed and sealed off by a normally solid fusible sealant 32. This sealant 32 is chosen to have a softening or melting point which substantially corresponds to the critical high internal cell temperature at which it is necessary to vent gas from inside the cell. Preferably, the softening or melting point of the sealant 32 is just below (e.g., about 25°F. or less) the critical high cell temperature. Suitable sealant materials for use in the case of a magnesium cell designed to vent gas below an internal cell temperature of about 200°F. include, for example, waxes and bitumens (asphalt, pitch, etc.).

During assembly of the cell, the sealant 32 is preferably applied while in a molten state around the upper portion of the central carbon electrode rod 14. The cover 18 is then forced down tightly around this upper end of the electrode causing the molten sealant to flow freely into the space left by the slot 30 and thereby to close the gas-venting passageway. It will be noted in particular that during this assembly step the inclined rear wall 30a facilitates the flow of the molten sealant into the slot 30 and also serves to lock the sealant in place once it solidifies and to prevent premature displacement of the sealant from the passageway under the influence of high internal gas pressures that may develop inside the cell. Any excess sealant which is left on the surface of the central carbon electrode rod 14 flows into and around the juncture 22 and assures that this juncture is tightly sealed upon assembly of the cell.

Thus it will be seen that the dry cell is tightly sealed against the loss of moisture from inside the cell and consequently the cell will maintain its high service capacity during storage and eventual use under normal conditions. If, however, the cell is subjected to severe or abusive conditions such as may occur in the case of a magnesium cell, for example, when the cell is placed on a short-circuit load, the heat which is evolved along with the build-up of high internal gas pressures, will cause the sealant 32 to soften or melt and thereby open the gas-venting passageway to allow the gas to escape from inside the cell. Once the gas-venting passageway opens, it will remain open even though the heat which may continue to evolve should soften the insulating cover 18. Ordinarily, in conventional cells this softening of the insulating cover can cause the vent opening or passageway, which has been formed within an intermediate portion of the cover, to deform and possibly even close and block the passage against the flow of gas from inside the cell. With the present construction, it will be noted that the surface portion 14a on the central carbon electrode rod 14 which coincides with the slot 30 and which is structurally stable at these elevated temperatures, actually provides mechanical support for the area of the insulating cover 18 surrounding the gas-venting passageway and aids in preventing its collapse. It is to be noted in this connection that the deep elongated rectangular configuration of the slot 30 as referred to hereinabove offers an additional advantage in that this shaped opening tends to resist plastic deformation. An additional advantage of the present construction is that the sealant 32 which closes the gas-venting passageway lies adjacent to the central carbon electrode 14 which being a good conductor of heat assures that the sealant will melt or soften when the cell approaches the critical high temperature at which gas-venting must occur.

It will also be noted that in this embodiment of the invention a metal terminal cap 34 is fitted tightly over the protruding end of the central carbon electrode rod 14 as in the case of most conventional cells. However, the cap 34 terminates a short distance above the top surface of the cover 18 and therefore does not interfere with the free passage of gas through the fail-safe vent.

Figure 6:
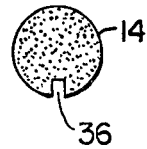
FIG. 6 is a plane view of the central carbon electrode rod used in the cell of FIG. 4.
Figure 7:
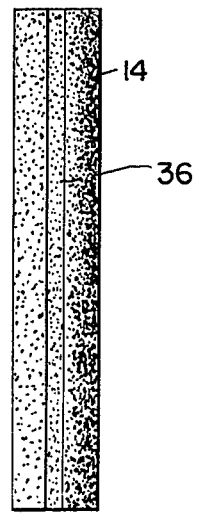
FIG. 7 is an elevational view of the central carbon electrode rod shown in FIG. 6.

FIGS. 4–7 of the drawing show another embodiment of the invention wherein the gas-venting passageway is formed by the provision of an indentation within the central carbon electrode rod 14. In this embodiment, like reference numerals refer to the same cell elements as described hereinabove. The seal closure for this dry cell construction is assembled in basically the same manner, that is, the insulating cover 18 is force-fitted around the protruding end of the central carbon electrode rod 14 and the cover 18 is force-fitted and sealed radially within the open end of the anode-container 10. The central carbon electrode rod 14 as more clearly shown in FIGS. 6 and 7, is provided on its outer surfaces with a longitudinal slot 36. The depth of the longitudinal slot 36 is greater than its width and preferably the depth is at least twice the width of the slot. This longitudinal surface slot 36 forms a gas-venting passageway together with the coinciding surface portion on the inner peripheral surfaces of the cover 18 as denoted by the reference numeral 22a in FIG. 5. During cell assembly, the gas-venting passageway is closed and sealed off in the same manner as described hereinabove, with a solid fusible sealant 38. This sealant 38 is chosen in the same manner to have a softening or melting point below some critical high internal cell temperature at which it is desirable to vent gas from inside the cell. It will be noted that the advantage of the fail-safe vent of this embodiment is that the gas-venting passageway is formed for the most part by the walls of the longitudinal slot 36 within the central carbon electrode rod 14.

It will of course be understood that a number of modifications may be made in the embodiments of the fail-safe vent described hereinabove without departing from the spirit of the invention. For example, it is possible to make the gas-venting passageway of a shape or configuration other than rectanular, e.g. circular or oval, although a rectangular passageway is preferred. Moreover, it is entirely within the concept of the invention to use an insulating cover which is made from a thermosetting plastic material.

What is claimed is:

1. A primary dry cell comprising, in combination, a cylindrical metal container having an open end, a central carbon electrode rod protruding beyond the open end of said container and a seal closure for sealing the open end of said container, said closure comprising an annular insulating cover having its inner peripheral surface fitting tightly around the protruding end of said carbon electrode rod forming a juncture therebetween which is tightly sealed except for a gas-venting passageway extending through said juncture for releasing high internal gas pressure at a predetermined high temperature level, said gas-venting passageway being defined by an indentation within at least one of said cover and said carbon electrode rod located at said juncture and by a portion of the other of said cover and said carbon electrode rod which coincides with said indentation whereby part of the walls of said passageway are formed by said carbon electrode rod which is thermally stable at said predetermined high temperature level, said gas-venting passageway being closed by a normally solid fusible sealant having a softening or melting point which substantially corresponds to said predetermined high temperature level.

2. A primary dry cell in accordance with claim 1 wherein said annular insulating cover is provided with a slot within its inner peripheral surface forming said gas-venting passageway together with the coincident surface portion on said central carbon electrode rod.

3. A primary dry cell in accordance with claim 2 wherein said slot is of a rectangular configuration.

4. A primary dry cell in accordance with claim 3 wherein the depth of the rectangular slot is greater than the width thereof.

5. A primary dry cell in accordance with claim 4 wherein the depth of the rectangular slot is at least twice the width thereof.

6. A primary dry cell in accordance with claim 1 wherein said central carbon electrode rod is provided with an elongated surface slot forming said gas-venting passageway together with the coincident portion on the inner peripheral surface of said insulating cover.

7. A primary dry cell in accordance with claim 6 wherein said slot is of a rectangular configuration.

8. A primary dry cell in accordance with claim 7 wherein the depth of the rectangular slot is greater than the width thereof.

9. A primary dry cell in accordance with claim 8 wherein the depth of the rectangular slot is at least twice the width thereof.

10. A primary dry cell in accordance with claim 1 wherein said normally solid fusible sealant is selected from the group consisting of waxes and bitumens.

* * * * *